350-361 SR
XR 2,721,319
OSS REFERENCE SEARCH ROOM
TX 3096D
ADDED

Oct. 18, 1955 R. L. GARMAN ET AL 2,721,319

LIGHT MODULATING SYSTEM USING A CATHODE RAY TUBE WITH ELLIPTICAL MIRROR

Filed Sept. 12, 1952 2 Sheets-Sheet 1

INVENTOR.
RAYMOND L. GARMAN
LOUIS P. RAITIERE
BY H. L. Mackey
ATTORNEY.

2721319
NO OR CLASSIF

INVENTOR.
RAYMOND L. GARMAN
LOUIS P. RAITIERE
BY H. A. Mackey
ATTORNEY.

United States Patent Office 2,721,319

Patented Oct. 18, 1955

2,721,319

LIGHT MODULATING SYSTEM USING A CATHODE RAY TUBE WITH ELLIPTICAL MIRROR

Raymond L. Garman and Louis P. Raitiere, Pleasantville, N. Y., assignors to General Precision Laboratory Incorporated, a corporation of New York Application September 12, 1952, Serial No. 309,288

3 Claims. (Cl. 340—370)

This invention relates to a light valve or modulating device and particularly to a device for reproducing or enlarging the facsimile or image produced on a cathode ray screen.

The invention is particularly adapted to a plan position indicator, commonly used in radar navigation aids, and one of the advantageous features of the invention is its ability to increase the signal-to-noise ratio to thus enhance the resolution of the enlarged projected image.

The invention is directed to the provision of an improved target for a scanning-ray tube and an associated optical system whereby the transmission of light from an independent source may be controlled by the scanning ray to reconstruct an enlarged image with a greatly increased intensity of illumination and without the usual difficulties associated with "keystoning effects." In this type of light control, referred to in the art as an "electrical transparency control," where the varying transparency of the control system modulates the separate light source there is inherent difficulty because the separate light source cannot be placed on the axis of the electron beam scanning system, with the result in the prior devices that in presenting the scanning beam to the target there is foreshortening of the image dimensions, or "keystoning."

Also, in previous systems of this same general type, in addition to the disadvantage of keystoning the optical aperture must be kept quite small.

Heretofore, extensive efforts have been made to develop devices for controlling or modulating a source of high intensity illumination electronically in order to enlarge images of various kinds, particularly the facsimile of a target indication or a picture image on a cathode ray tube in a television set. Various means have been suggested including variable light transmitting crystals including polarizing materials. In order to get sufficient illumination it is necessary to modulate a separate light source because the light intensity from a persistent cathode tube screen of the type used in television sets or in target indication systems is too low for satisfactory projection. Accordingly, the primary object of the present invention is to provide an improved means for modulating a source of light in accordance with a modulating electrical signal, the modulation of which may represent an image or any other type of intelligence signal.

Another object is to provide a novel cathode ray tube having an electron-sensitive screen on which an image or facsimile is developed in association with means for controlling the modulation of a separate source of illumination in accordance with the variations in shading of the image on the cathode ray tube screen and without a "keystoning" effect on the image.

A still further object is to provide such a system in which the persistency of the light-modulating means can be varied at will.

A still further object is to provide such a device in which the signal-to-noise ratio will be greatly increased over devices heretofore known.

Other and further objects will be readily apparent to those skilled in the art and considered in connection with the accompanying drawings in which.

Broadly speaking, the present invention provides a special light modulating device in which the special cathode ray tube forms part of a collimating optical system. The modulation is accompanied by point-to-point deformation of a special electroncally-deformable viscous film on the inside of a cathode ray tube face which constitutes the cathode ray beam target, under the influence of the electrons of the cathode ray beam. The modulation of the cathode ray beam can be effected in turn by an electrical signal representing any intelligence or quantity.

Figures 1, 3, 4, 5, 6:
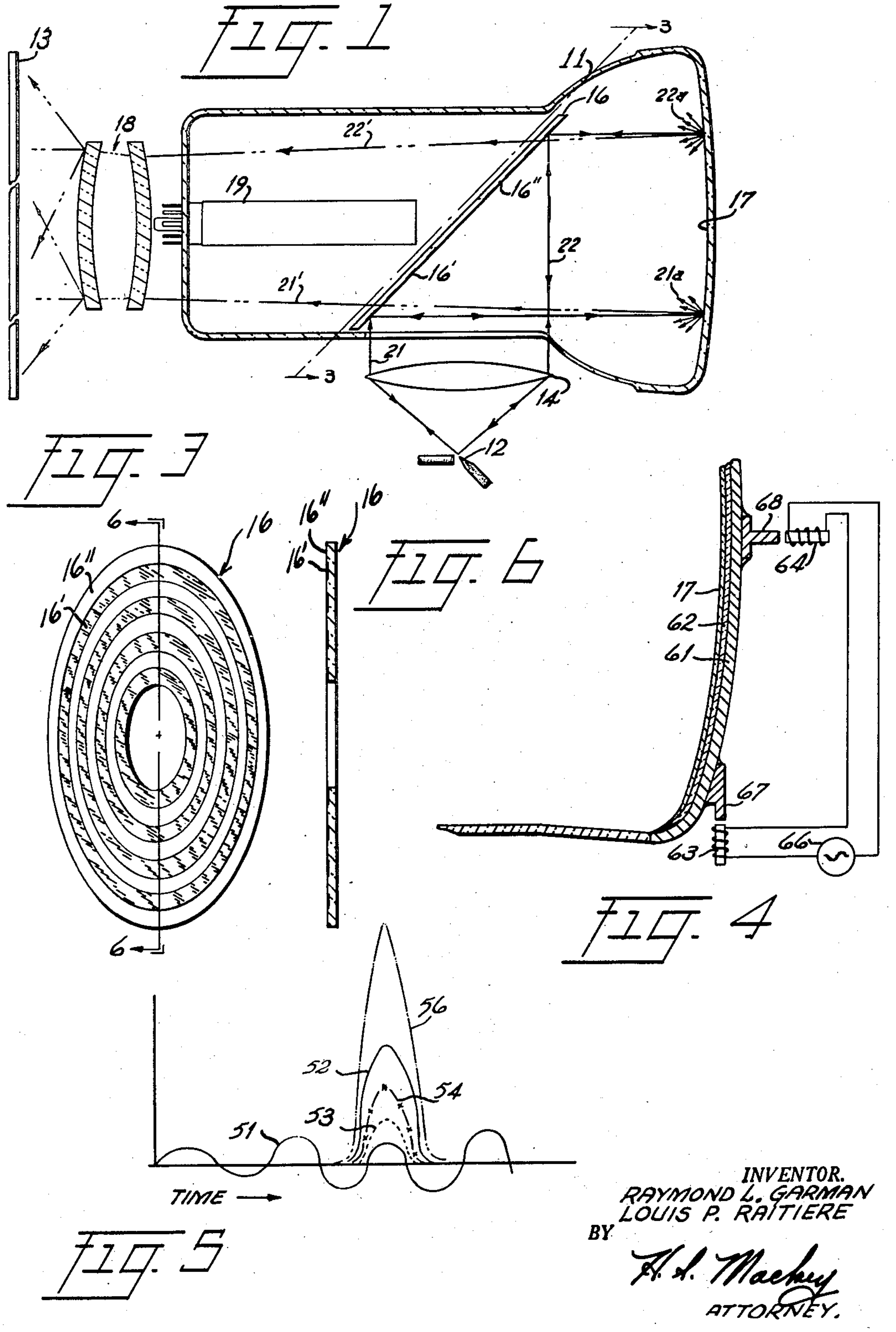
Figure 1 is a general view showing the arrangement of the novel cathode ray tube in association with the separate source of illumination and the projection means.
Figure 3 is an enlarged orthographic projection of the special mirror on plane 3—3 of Fig. 1.
Figure 4 is a partial section of the novel cathode ray tube screen and illustrates the means for applying high frequency vibrations to the screen to cause the special reflecting film to return to its normal condition.
Figure 5 is an enlarged graphical representation of the special refracting material in which the effective signal-to-noise ratio is increased.
Figure 6 is a sectional view taken on the line 6—6, of Fig. 3.

The general arrangement of the special cathode ray tube and its associated system is shown in Fig. 1 in which a special cathode ray tube 11 is interposed optically between a suitable source of illumination 12, such as an arc lamp or a tungsten filament lamp, and a projection screen 13. A suitable condensing lens system 14 is positioned between the light source 12 and a special grill mirror 16 which is preferably arranged inside of the glass enclosure of the cathode ray tube 11. As shown in Fig. 3 the grill 16 comprises a series of concentric alternate annular elliptical reflecting zones 16' and intervening transparent zones 16''. The end of the cathode ray tube is provided with a special mirror surface 17 of the proper curvature so as to reverse any light which is directed toward it by the reflecting zones 16'. For reasons apparent hereinafter the surface 17 is spherical. The lens system 14 projects light rays from the source 12 in parallel relation so that the light rays which strike the reflecting zones 16' of the grill mirror 16 will be reflected to the mirror surface 17 and will normally be reflected back by the latter in a reverse direction against the annular reflecting zones 16' back to the optical system 14 and thus no light rays will be projected through the optical projection system 18 to the screen 13. On the other hand, should the mirror surface 17 be deformed, or if anything should occur which causes dispersion of light at the surface 17 all of the light rays will not retrace their incident paths and, therefore, some light rays will pass through the intermediate annular transparent zones 16'' of the grill mirror 16 and through the optical system 18 to the screen 13.

The elements of the optical system shown in Fig. 1 are the equivalent of what is commonly referred to as a Schlieren optical system. The operation of this system is based on the fact that it is possible to superimpose the image of a hole with the mask of the hole.

In the present instance the lens 14 directs light from the source 12 toward the grill mirror 16 having the alternate reflecting and transparent zones 16' and 16'' respectively, from which light rays are reflected toward the concave target mirror surface 17. Under perfect optical conditions the mirror surface 17 reflects the light back to the grill mirror 16 through the lens 14 to the original source 12. The reflecting zones 16′ of the grill mirror 16 may be considered optically equivalent to the slits of a Schlieren mask and when the light is reversed by the mirror surface 17 these same reflecting zones constitute masks which intercept light reflected from the mirror 17 and prevent any substantial amount of light from being projected forwarded toward the screen 13. In this case, the object of the optical system is composed of a plurality of concentric circular rings of light reflected from the reflecting zones 16′. As can be shown mathematically by those skilled in the art, in order for the above conditions to exist there is an optimum condition determined by the ratio of the distance between the object plane, represented in this instance by the grill mirror 16, and the mirror 17, to the width of the reflecting zones 16′.

For purposes of general explanation of the invention, it might be considered that the light rays indicated by the solid lines 21 and 22 proceed from the lens 14 toward the grill mirror 16 from which they are reflected against the mirror surface 17. The mirror surface 17 will be illuminated by rings of light represented by the solid lines reflected from the reflector zones 16′ and normally the mirror surface 17, being optically perfect, will reflect the light back as indicated by the double arrow-heads on the solid lines 21 and 22 in sharply defined rings which conicide with the reflector zones 16′ which constitute masks for the light rings. Actually, the image of any one point of the "object" will be formed at a diametrically opposite point of symmetry with respect to the optical axis of the mirror 17. It is for this reason that the alternate reflecting and transparent zones 16′ and 16″ respectively, are of such shape and disposition relative to the optical axis of the mirror 17 that their projections on the mirror surface 17 are circles. In other words, they are zones of symmetry relative to the optical axis of the mirror 17.

As will be pointed out hereinafter, in language as simple as possible, certain inherent aberrations of spherical mirrors are relied upon to accomplish the objectives mentioned above. An extremely unwieldy mathematical treatise would be necessary to give a complete technical explanation of this but it is believed that it would not serve any useful purpose here as it would be intelligible only to those who have made a specialty of higher optical physics.

If the light rays reflected from any point on the mirror 17 are diffused in any manner as indicated by the short arrows 23 and 24, there will be a corresponding modulation (or variation) of the amount of light reflected back toward the grill mirror 16 in the direction of the solid lines. Although not shown on the drawings modulation of light from a point on one side of the axis of symmetry will appear as a change in the light from the diametrically opposite point on the mirror 17. In the present instance, the modulation of the light is effected by an electronically deformable viscous film on the surface of the target mirror 17. The electron beam creates a small "hump" or "pimple" in the viscous film and diffraction takes place at that point, as distinguished from regular reflection which normally takes place where the viscous film presents an optically perfect surface which conforms to the surface 17. Since the distorted viscous film at the minute point on which the beam impinges becomes an imperfect optical surface, diffraction of light takes place and therefore the image of this minute point is no longer focused on the diametrically opposite point of symmetry on the same reflector zone and the reflector zone is therefore no longer a mask for all of the light rays from this point, but instead some components of the light represented by the lines 21*a* and 22*a* will pass through the adjacent transparent zone 16″ to the screen 13. The modulated electron beam which continuously scans the target mirror 17 causes point-to-point deformations of the viscous film which are very small as compared to the size of the diameter of the electron beam. These deformations cause point-to-point variations in the diffraction characteristics of the viscous film on the mirror surface 17 and thus an enlarged image is "painted" on the screen 13 by the dispersed light which is not masked by the reflecting ring zones 16′.

The image in the form of the mosaic on the viscous film of the mirror 17 is not in a technical sense the "object" of the optical system although it is the subject which is being projected in an enlarged scale on the screen 13. As previously mentioned the "object" of the system is the source of light constituted by the rings of light reflected from the mirror 16. Effectively, the modulation of the light rays by the special cooperation between the special grill mirror 16 and the mosaic on the surface 17 is what produces the enlarged image on the projection screen 13. The diffraction grating on the viscous film may represent the conventional video pattern or any other signal intelligence.

The manner in which the light modulating optical system operates is in general illustrated in Fig. 3. It is seen from this figure that the grill mirror 16 constitutes a special type of Schlieren mask including the alternate annular reflecting and transparent zones 16′ and 16″, respectively. In the usual Schlieren system the grill is made of parallel alternate opaque and transparent elongate areas. However, in the instant electrical transparency control system where the effectively varying transparency of the control system modulates a separate light source, there is inherent difficulty because the separate light source cannot be placed on the axis of the electron beam scanning system, and consequently it is necessary to arrange the special mirror 16 at an oblique angle with respect to the central axis of the cathode ray beam. The present invention utilizes the inherent tangential aberration of a spherical mirror, such as mirror 17 in a system which makes it possible to arrange the source of light off the axis of the electron beam and without undesirable keystoning effects. Accordingly, the zones 16′ and 16″ of the mirror 16 must be symmetrically arranged with respect to the optical axis of the mirror 17. They are therefore, elliptical so that the rings or bands of light-reflected onto the mirror 17 are circular as previously mentioned.

Because the tangential image of a spherical mirror falls in a curved surface different from the curved surface of the radial or sagittal image, it is possible to use the system described herein, relying upon the light forming the tangential image which will pass through the transparent zones 16″ in the manner described above to provide an enlarged image of increased illumination of the mosaic on the mirror surface 17.

A practical demonstration of the optical principles involved can be easily demonstrated. It can also be shown by complex mathematical calculations too complicated to serve any useful purpose here. However, there are certain simple conditions in a Schlieren system which must be satisfied in order to accomplish the desired end result. The angle ($i$) subtended by the rings or bands of light on the surface 17 bears the following relation to the radial distance between reflector and transparent zones 16′ and 16″ of the grill mirror 16 and the distance between the spherical mirror 17 and the grill mirror 16.

$$\sin i = \pm kn\lambda \qquad (1)$$

where $$(k) = (a)\ \text{constant} = 1,\ (n) = \frac{1}{a}$$

where ($a$) is the period or distance between the rings or bands of light and $\lambda$=wavelength of the light. Since ($i$) is very small, $$i = \pm n\lambda \qquad (2)$$

The maximum of light can pass to the screen 13 for a given kind of corrugation of the surface 17 when $$i=\frac{\epsilon}{d} \qquad (3)$$

where $\epsilon$ is the period or width of the reflector zones, and where $(d)$ is the distance between the grill mirror 16 and the mirror surface 17.

From Equations 2 and 3 is obtained $$\epsilon=n\lambda d \qquad (4)$$

In order to generate the desired deformations in the viscous film on mirror surface 17 the spot size of the electron beam should be no more than one-quarter of the desired local period of the deformation which in turn should be close to one-half of the size of the picture element. Assuming that the spot size is .001" in the direction of the scanning lines and $(a)=0.1$ mm., then $(n)=10$.

Arbitrarily taking a value of 13 inches or 330 mm. for $(d)$ and taking the wavelength of light in the middle of the visible spectrum equal to $6\times10^{-4}$ mm., Equation 4 gives $$\epsilon \overset{v}{=} 2 \text{ mm.}$$

In accordance with the present invention, the viscous film applied to the inside of mirror surface 17 is formed of a material such as oil having a low vapor pressure and which is especially compounded so that it will be readily deformed by the electron beam from the cathode ray gun 19.

Figure 2:
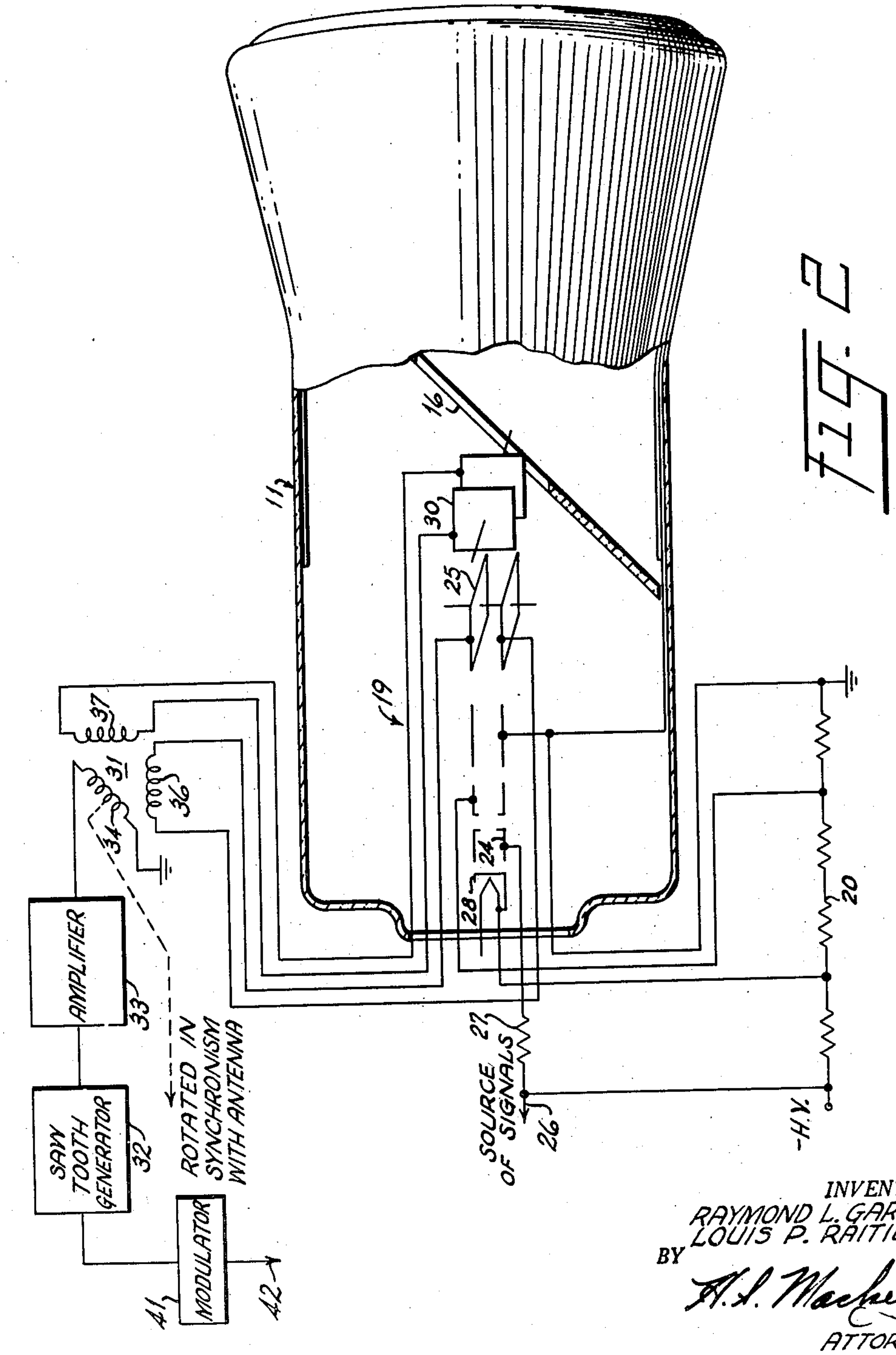
Figure 2 is an enlarged view of the novel cathode ray tube showing the electrical elements and the energizing circuits.

The manner in which an enlarged facsimile of the image produced on the mirror surface 17 is projected on a screen 13 is illustrated in Fig. 2 which illustrates the conventional arrangement for providing plan position indicator scanning of the target mirror 17 of the cathode ray tube 11. The cathode ray tube 11 is preferably of the electrostatic deflection type having a pair of vertical deflecting plates 25 and a pair of horizontal deflecting plates 30. The cathode is indicated at 28 and the intelligence signals may be applied to the control grid 24 through the conductor 26, the control grid 24 being biased by the resistor 27. Conventional accelerating and focusing electrodes are energized from a common source of direct current voltage indicated in the drawing by the voltage divider 20. In order to provide the usual radial scan for P. P. I. tubes the respective vertical and horizontal deflecting plates 25 and 30 are energized through a suitable resolver 31 from a sawtooth generator 32 and an amplifier 33. The rotor winding 34 of the resolver 31 is energized by the sawtooth generator 32 and is rotated in synchronism with the antenna (not shown) in accordance with conventional plan position indicator radar technique. Accordingly, the space quadrature windings 36 and 37 represent the sine and cosine functions, respectively, of the angular position of the rotor winding 34 and the position of the radial scan of the electron beam from the cathode 28 will change in synchronism with the rotation of the antenna. In the type of plan position indicator cathode ray tube shown the beam scans from the center radially outwardly toward the edge of the screen. Since the data supplied to the cathode ray tube 11 is in terms of polar coordinates, the mirror surface 17 is scanned from the center or origin of the picture radially outwardly and each successive scan is rotated by an angle corresponding to the rotation of the antenna.

Since the "humping" or the point-to-point deformation of the film on the mirror surface 17 is dependent upon the electrostatic charge on the viscous film, this deformation can be accomplished by any one of several methods which varies the net charge produced on a given area by the cathode ray beam. Since the net charge $Q=It$ where (I) is the current and $(t)$ is the time interval, modulation can be provided by varying the current or time or both.

One manner in which this may be accomplished is by applying a modulating signal voltage to the control grid through the conductor 26 as described, assuming linear radial sweep velocity, or the beam intensity may remain constant with the radial velocity of the beam being modulated. This velocity modulation may take the form of continuous variation or pulse type of modulation. In the velocity modulation with constant beam intensity the charge received by the viscous film will be in proportion to the interval of time during which the electron beam impinges upon a particular point on the film. The velocity modulation may be accomplished by any suitable modulator 41 for controlling the sawtooth generator 32, the modulator 41 being any well-known device which effectively expands and contracts the time base. Alternatively, the modulator 41 may be energized by a sinusoidal or square wave signal having a frequency which is high with respect to the reciprocal time interval of the active sweep period. If the amplitude of this square wave is varied in accordance with the amplitude of the input signal, the velocity of the beam scan will be varied accordingly. In the latter instance the source of the signal, such as the radar echo signal, would be applied to the modulator 41 through the input conductor 42 instead of being applied to the control grid 24 through the conductor 26.

In a further alternative arrangement, the radial scan can be divided into a multitude of small time segments by supplying the output of a multivibrator to the grid or cathode of the cathode ray gun 19 with a frequency which is high in comparison to the reciprocal time interval of the active portion of the radial sweep. If the ratio of the "on" pulses is increased with respect to the "off" pulses in proportion to the intensity of the radar signal a mosiac will develop on the viscous film representing the radar signal intelligence. It will be readily apparent, however, that it is possible to use either system of modulation alone or both in combination if desired.

It is to be noted that effects of "keystoning" are avoided in the preferred form of the apparatus illustrated, since the cathode ray gun 19 is placed in the center of the cathode ray tube 11 and the plane of the target mirror 17 is normal to the axis of the gun 19 and to the axis of the projection system 18. This has another important advantage because the center of the object is on an axis of symmetry, that is, the optical axis of mirror 17. Since only a small amount of light is intercepted by the gun 19 along the axis of the mirror no shadows or images are cast because this part of the optical system is not in focus at the screen 13.

As is well understood, the signal-to-noise ratio is of very great importance and the present device exhibits a buildup or storage effect which greatly increases the signal-to-noise ratio. This will be readily understood from the fact that pure noise is completely random and, therefore, will vary in amplitude from instant to instant and, accordingly, the individual points on the cathode ray screen corresponding to a peak noise signal may appear at one position during one scan, but during the next scan the point on the screen representing this peak noise signal may have changed to a different position on the screen while each radio-echo will produce a peak signal at substantially the same position on the screen because of the low ratio between the displacement of the target representation on the screen and the movement of the target. This is illustrated in Fig. 5, where the time axis is plotted as the abscissa and the amount of deformation of the viscous film on the surface of the mirror 17 is plotted as ordinates. The irregular curve 51 represents the instantaneous deformation of the surface of the film representing the instantaneous values of random noise. The solid line curve 52 represents the deformation at the position on the mirror 17 corresponding to the position of a radar target. The viscosity of the oil film on the mirror 17 is so selected that it reduces to a predetermined value, for example, 25% of its initial height during one complete cycle of the angular swing of the scanning beam track. The dash line curve 53 represents the level to which the curve 52 has decreased during one cycle of the angular swing of the scanning beam track. The dash-and-*x* line curve 54 is a composite curve representing the summation of the noise curve 51 and the curve 53 at the end of the first cycle of the angular swing of the scanning track. Accordingly, during the next cycle of the swing of the scanning track a deformation corresponding substantially to the value of the curve 52 will be added to the composite curve 54 to produce a second composite curve 56. However, in view of the fact that pure noise is a random variation the curve 51 at this point on the screen may be something more or less than that as shown, but in any event it will be very much less than the value represented by the curve 56 at the same point on the screen. Then assuming that the value of the curve 56 again decreases to approximately 25% of its maximum during the next cycle of the angular rotation of the scanning track, the curve representing the deformation corresponding to the signal will still be relatively high. Of course, this action will be repeated in the subsequent cycles of rotation of the scanning beam track and, of course, the upper limit of the deformation of the mirror surface will be limited by forces of gravity and the surface tension of the film on the surface 17.

The electrostatic forces on the film caused by the electron beam will tend to cause the film to migrate on the mirror surface 17 and, therefore, suitably energized electrostatic plates may be provided for the purpose of neutralizing any tendency to migrate. In order to remove the natural tendency for the film to cling to the surface of the mirror and thus depart from the general curvature of the mirror surface 17 high frequency vibrations should be sufficiently high as to have a wavelength which is short enough so as not to produce visible images on the screen.

To this end as shown in Fig. 4 a metal plate 61 is bonded to the outer face of the cathode ray tube through an intermediate layer of material usch as a ceramic composition 62. Preferably the layer 62 of ceramic material should have a very high modulus of elasticity so the vibrations applied to the mounted plate 61 will be transmitted to the end of the tube 11 and the mirror 17. The ceramic material 62 could be bonded both to the metal plate 61 and to the curved end of the cathode ray tube, in accordance with conventional practice. Suitable means may be provided for applying vibrations both transversely and longitudinally of the axis of the cathode ray tube. By means of suitable vibrators 63 and 64, which are energized by a suitable source of high frequency energy 66, transverse and longitudinal vibrations may be applied to the plate 61. The oscillator supplying power to the transducer may be varied in frequency at a high rate to prevent the formation of wave patterns on the oil film from $f$ to $3/4f$ back to $f$. The vibrator 63 can be arranged to engage a boss or projection 67 extending laterally from the plate 61 in such manner that vibrations are applied transversely of the axis of the cathode ray tube 11. Similarly, the vibrator 64 may engage a projection 68 in the center of the plate 61 with the vibration forces being applied longitudinally of the cathode ray tube 11.

It may be deisrable in some instances to coordinate the operation of the high frequency generator 66 with the application of the input signals to the cathode ray tube so that the vibrations would be periodically interrupted between successive images and then started again to smooth the film. This features is not specifically illustrated in the drawings because a system for producing such alternate operations is well within the knowledge of one skilled in the art.

With reference to the viscous film on the mirror 17, there are several materials which could be used. In particular, any transparent or translucent dielectric material which is sufficiently viscous that it can be readily influenced by an electron beam may be utilized. The conductivity of the film may be varied by adding materials such as graphite and this will have a bearing on the time that it takes for the charge to leak off, and therefore will effect the "persistency" of the film. The primary advantage of using an oil film is that the surface of liquids are optically perfect.

It might appear from the drawings that it is intended that the cathode ray tube 11 would be mounted on its side. However, in actual practice the cathode ray tube would preferably be mounted with this axis extending vertically in order to facilitate the even disposition of the film on the mirror surface 17. It will be readily apparent that there are various changes of modifications which may be made by one skilled in the art without departing from the inventive concept disclosed herein. Accordingly, the illustrations herein are to be considered merely as representative of an embodiment of the invention.

What is claimed is:

1. Apparatus for producing a video picture by means of a cathode ray tube and a separate light source, comprising means for generating a focused beam of electrons, means for causing scanning of said beam over a predetermined area about a central axis, a concave target mirror disposed normal to said central axis, a separate source of light, a grill including reflecting surfaces separated by intermediate transparent zones disposed transversely symmetrically about said central axis for directing light from said separate source of illumination toward said target mirror, the plane of said grill being oblique to said central axis and said reflecting surfaces being elliptical so that they project as circular areas on said target mirror, an electrostatically-deformable viscous film on the surface of said target mirror adapted to be deformed by said electron beam for varying the point-to-point diffraction of light directed to said target mirror from the reflecting surfaces of said grill in accordance with the varying characteristics of said electron beam.

2. Apparatus for producing an enlarged representation of an Eidophor image on a cathode ray tube target, comprising a cathode ray tube having means for generating a focused electron beam including an electron gun, means for varying the characteristics of said electron beam, means for scanning said electron beam radially and causing the scanning sweep to rotate about the central axis, a target mirror having its optical axis coincident with said central axis, a separate source of light, a grill surrounding said central axis and including reflecting surfaces for directing light from said separate source of illumination toward said target mirror and having intermediate transparent zones, said grill being arranged at an oblique angle with respect to the axis of said target mirror with the shape of said zones being elliptical so that their projections on said target mirror are circular, a projection lens system positioned to receive light reflected from said target mirror through the transparent zones of said grill, a viscous film on the surface of said target mirror deformable in response to said electron beam for producing elemental diffraction areas on said target mirror, said deformations cooperating with said grill to produce a moving area of diffracted light which moves in synchronism with said scanned electron beam and the effective intensity of which varies in accordance with the characteristics of said beam.

3. A new article of manufacture for modulating a source of light in response to video signals for the purpose of translating video signals into an enlarged image of increased light intensity comprising, a cathode ray video tube having a target anode provided with a mirror surface to serve also as a light mirror, means for generating a focussed beam of electrons including an electron gun mounted with its axis coincident with the optical axis of said target anode-mirror, means for scanning the electron beam radially over the surface of said target anode-mirror and causing the scanning sweep to rotate about the axis of said mirror, the mirror surface of said target anode-mirror having a viscous light-dispersing film deformably responsive to said electron beam, a source of illumination, means for directing light from said source toward said anode-mirror including a grid-like mirror system having alternate reflecting and transparent zones so arranged between said source of illumination and said anode-mirror as to constitute a Schlieren optical system, said grid-like mirror being arranged symmetrically with and at an angle to the optical axis of said anode-mirror with the shape of said zones being elliptical so that their projections on said target mirror are circular, said reflecting zones reflecting light from said source to said anode-mirror and returning light to said source in the absence of deformation of said deformable film whereas the alternate transparent zones permit light dispersed by deformation of said viscous film to be projected beyond said mirror system to form a projected video image, whereby deformation of said film under the influence of the scanning electron beam effectively produces a moving area of diffused light which moves with said electron beam and the effective intensity of which varies in accordance with the video modulation of said electron beam.

References Cited in the file of this patent

UNITED STATES PATENTS

| | | |
|---|---|---|
| 2,128,631 | Eaton | Aug. 30, 1938 |
| 2,335,659 | Fraenckel | Nov. 30, 1943 |
| 2,391,450 | Fischer | Dec. 25, 1945 |
| 2,398,960 | Prosser | Apr. 23, 1946 |
| 2,419,550 | Hardy | Apr. 29, 1947 |
| 2,454,488 | Sokumlyn | Nov. 23, 1948 |
| 2,605,462 | Reed et al. | July 29, 1952 |
| 2,644,938 | Hetzel et al. | July 7, 1953 |